United States Patent [19]

Mallery

[11] Patent Number: 5,697,497
[45] Date of Patent: Dec. 16, 1997

[54] BOOKLET STORAGE COMPARTMENT FOR COMPACT DISK CASE

[76] Inventor: Daniel C. Mallery, 10969 Rochester Ave., Apt. #403, Los Angeles, Calif. 90024

[21] Appl. No.: 677,963

[22] Filed: Jul. 10, 1996

[51] Int. Cl.$^6$ ................................................. B65D 85/57
[52] U.S. Cl. ........................................ 206/308.1; 206/232
[58] Field of Search ............................ 206/308.1, 307, 206/309, 232, 387.14, 387.15, 310–313, 485, 493; 40/649, 611, 765; 108/27, 43, 44; 312/234, 234.1, 234.2, 234.3

[56] References Cited

U.S. PATENT DOCUMENTS

| | | | |
|---|---|---|---|
| 5,259,498 | 11/1993 | Weisburn et al. | 206/308.1 |
| 5,267,647 | 12/1993 | Stumpff et al. | 206/308.1 |
| 5,388,713 | 2/1995 | Taniyama | 206/308.1 |
| 5,471,794 | 12/1995 | Nishioka | 40/611 |
| 5,477,961 | 12/1995 | Taniyama | 206/308.1 |
| 5,495,940 | 3/1996 | Taniyama | 206/308.1 |
| 5,513,749 | 5/1996 | Simmons | 209/308.1 |

FOREIGN PATENT DOCUMENTS

| | | | |
|---|---|---|---|
| 490671 | 6/1992 | European Pat. Off. | 206/308.1 |

*Primary Examiner*—Paul T. Sewell
*Assistant Examiner*—Luan K. Bui

[57] ABSTRACT

Within the compact disk case, a continuous inwardly extending slot flange member is employed to form a slot for receiving one side edge of a booklet or other printed material. The slot flange member extends along most of a full side edge length of the case, thereby providing a long, continuous slot. Alternatively, the slot flange member is formed of several portions which collectively form a slot. In one embodiment, inner corners of the slot flange portions each have a circular indentation sized and positioned to avoid interfering and damaging perimeter edges of a compact disk held in the case when the compact disk case is closed. In another embodiment, a front end of a single continuous flange is sloped upwardly to facilitate booklet insertion and removal. The compact disk case also includes an upwardly extending blocking member, along a front edge of the base of the case, having tapered profile. The blocking member prevents the booklet from accidently sliding from the slot formed by the slot flanges. The blocking member is highest at the center of the front edge and decreases in height toward the sides of the case.

24 Claims, 5 Drawing Sheets

BOOKLET STORAGE COMPARTMENT FOR COMPACT DISK CASE

BACKGROUND OF THE INVENTION

1. Field of the invention

The invention relates to cases for compact disks (CD's), CD-ROMS, and the like, and in particular to a CD case having an improved compartment for storing a booklet, such as a CD liner notes booklet or a CD-ROM instruction booklet.

2. Description of Related Art

Many conventional cases for storing CD's, both music CD's and CD-ROM's, include a compartment for storing the CD along one wall and a second compartment for storing a booklet along an opposing wall. In such cases, the means by which the booklet is held could benefit from considerable improvement. The booklet is held in such manner that it is annoying both to remove and to insert the booklet. Moreover, efforts to remove or insert the booklet often result in damage to the booklet.

FIG. 1 illustrates a typical CD case 10 having a booklet storage compartment shown in solid lines and a CD storage compartment shown in phantom lines. A booklet 12 (also shown in phantom lines) is held against a flat base 13 by two pairs of opposing tabs 14, 15 and 16, 17 positioned along lateral side walls 18 and 20, respectively, of the interior of the case and by a pair of rectangular protrusions 22 formed along a leading or front edge 24 of the case. Tab recesses 19 are formed within the CD storage portion for accommodating the tabs when the CD case is closed.

In use, the pairs of tabs provide a rough conduit or slot for holding the booklet, while protrusions 22 prevent the booklet from sliding out from between the tabs past front edge 24. However, neither the tabs nor the protrusion work as effectively as desired.

The front and rear tabs are spaced a considerable distance apart. In use, as booklet 12 is pushed inwardly (in the direction of arrow 25) between the case side wall and the front and rear tabs, corners 26 of the booklet can strike front edges of rear tabs 15 and 17 causing damage to the booklet and annoyance to the user. Also, although not shown in FIG. 1, many conventional CD cases include openings formed through the side wall of the CD case beneath the tabs. These openings also tend to catch the leading corners of the booklet as it is inserted. Alternatively, corners 26 of the booklet simply fail to slide beneath rear tabs 15 and 17, requiring the user to partially remove then reinsert the booklet. Some CD cases employ a third, somewhat smaller, tab on each side wall positioned midway between the front and rear tabs which, however, provides little or no alleviation to the booklet insertion problems noted above.

Once successfully inserted, the booklet is often difficult to remove, particularly as a result of the configuration of protrusions 22. To remove the booklet, one can bend the center of front edge 24 of the case downwardly (as shown by phantom line 27), thereby displacing the edge of the booklet from the protrusions—ideally by an amount sufficient to allow the booklet to slide out from the case over the protrusion. Often, however, the leading edge 29 of the booklet catches on the protrusion, causing further possible damage to the booklet, and further annoyance to the user. In particular, outward corners 28 of the protrusions often are not displaced downwardly enough, as the case is bent, to allow passage of the booklet.

As an alternative to the bending the case downwardly to allow the booklet to pass over the protrusions, the center of the leading edge of the booklet can be bent upwardly. This action, however, results in similar removal problems as above—namely lateral portions of the leading edge of the booklet are not bent upwardly enough to pass over outward corners 28. The lateral portions of the leading edge of the booklet cannot be bent upwardly significantly because the adjacent side edges of the booklet are held in place by the side tabs. Other manual techniques for removing the booklet can be equally difficult. For example, one can attempt to bend the entire front edge of the booklet upwardly (rather than only the center of the front edge), then pull the booklet upwardly and outwardly at an angle. Such a motion, however, can damage the top side edges of the booklet by causing those edges to scrape against the front lower edges of front tabs 14 and 16 as the booklet is removed.

The foregoing problems are particularly acute for thick booklets. Indeed, for a booklet which is about as thick as the spacing between the tabs and the base of the booklet portion of the case, considerable effort is sometimes required to insert and remove the booklet without damage.

Some CD cases employ a pair of hemispherical knobs near the leading edge of the case, rather than rectangular protrusions, to hold the booklet in place. Although such knobs typically allow the booklet to be more easily removed, the knobs often do not adequately hold the booklet in place.

It would be desirable to provide a CD case with an improved means for holding a booklet, particularly a means which allows the booklet to be more easily inserted and removed.

SUMMARY OF THE INVENTION

In accordance with one aspect of the invention, an improved CD case is provided wherein a single inwardly extending slot flange member is employed to form a slot for receiving a booklet or other printed material. The single slot flange extends along most of the side edge length of the case, thereby providing a long, continuous slot. By providing a long, continuous slot, rather than a slot formed by two widely spaced tabs covering only a small portion of the side edge length of the case, the booklet insertion problems noted above are substantially overcome. In particular, once leading corners of the booklet are inserted into the slot, the booklet slides easily along the length of the slot without significant danger of catching, as can occur with cases wherein the slot is defined by a pair of widely spaced tabs.

In an alternative embodiment, each slot flange member is formed of a plurality of portions which collectively cover a significant portion of the side edge length of the case. Hence, the booklet slot, which is collectively formed from the portions of the slot flange, is not a continuous slot. Nevertheless, the danger of catching the booklet during insertion is significantly reduced over conventional CD cases of the type described above. In one embodiment, each flange member includes two flange portions which together cover at least half of the side edge length of the case. Inner corners of the flange portions include circular indentations sized to accommodate the outer perimeter of a CD when the CD case is closed with the CD held inside.

In accordance with a second aspect of the invention, the CD case is further improved by providing a upwardly extending blocking member along a front edge of the base of the case wherein the blocking member has a tapered profile such that the blocking member is highest at the center of the front edge of the case and decreases in height toward the sides of the case. The relatively high inner portion helps hold the booklet securely in place. The outer portions of the flange, however, are sufficiently low to avoid blocking or damaging the booklet as it is removed, particularly when the booklet is removed either by bending the center of the front edge of the CD case downwardly or the center of the front edge of the booklet upwardly.

Hence, the disadvantages of conventional CD cases, of the type described above, are substantially overcome. Other advantages, features and aspects of the invention will be apparent from the detailed description which follows and from the drawings.

DETAILED DESCRIPTION OF EXEMPLARY EMBODIMENTS

Referring to the remaining Figures, exemplary embodiments of the invention will be described. These embodiments are merely illustrative of the invention and should not be construed as limiting the scope of the invention.

Figure 2:
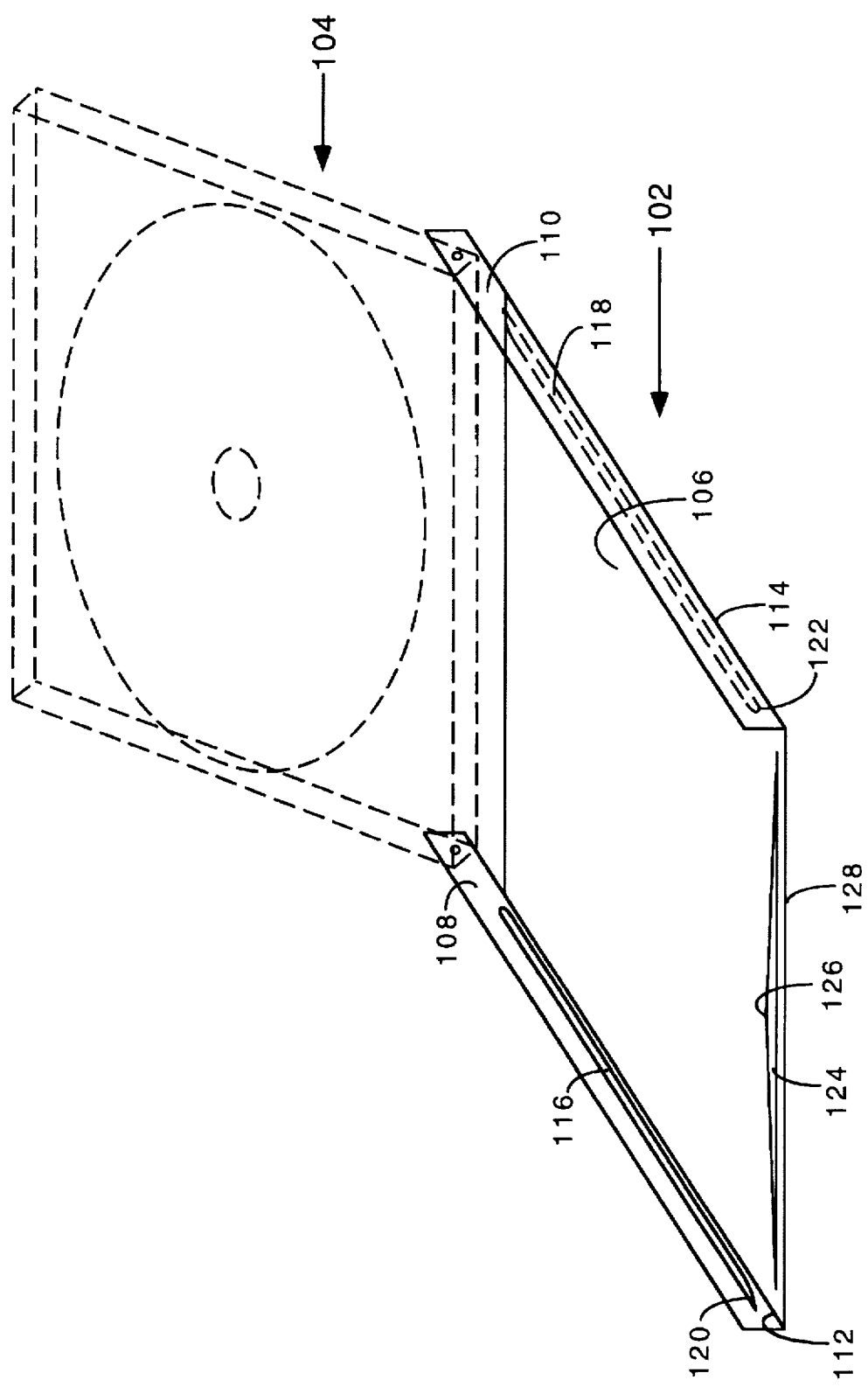
FIG. 2 is a perspective view of the booklet storage portion of a CD case, configured in accordance with an exemplary embodiment of the invention, with the CD storage portion shown in phantom lines.

FIG. 2 illustrates a CD case 100 having a booklet storage portion 102 and a CD storage portion 104 (shown in phantom lines.) Booklet storage portion 102 includes a base 106 and opposing side walls 108 and 110 extending upwardly from side edges 112 and 114, respectively, of base 106. Each side wall has a single inwardly extending slot flange (or slot flange member) 116 and 118, respectively. Slot flange 116, side wall 108 and base 106 together form a first slot for receiving a side edge of a booklet (not shown.) Slot flange 118, side wall 110 and base 106 together form a second slot for receiving an opposing side edge of the booklet.

Slot flanges 116 and 118 each extend along most of the length of side edges 112 and 114 form continuous slots. In use, a booklet is inserted into the slots by first placing leading corners of the booklet beneath leading edges 120 and 122 of slot flanges 116 and 118, respectively, then sliding the booklet along the length of the flanges. Because only a single continuous slot is provided for receiving each side edge of the booklet, the leading corners of the booklet do not strike or catch any intermediate tab edges, nor deviate from the slot, as can occur when using a conventional CD case of the type described above. Also, the greater slot length helps prevent booklets from becoming accidently dislodged. Leading edges 120 and 122 may be rounded or bevelled as shown.

Moreover, in the embodiment of FIG. 2, no openings exist between the inner and outer side surfaces of side walls 108 and 110, as are often provided in many conventional CD cases. The absence of such openings further helps prevent the booklet from catching or jamming as it is inserted.

Figure 1:
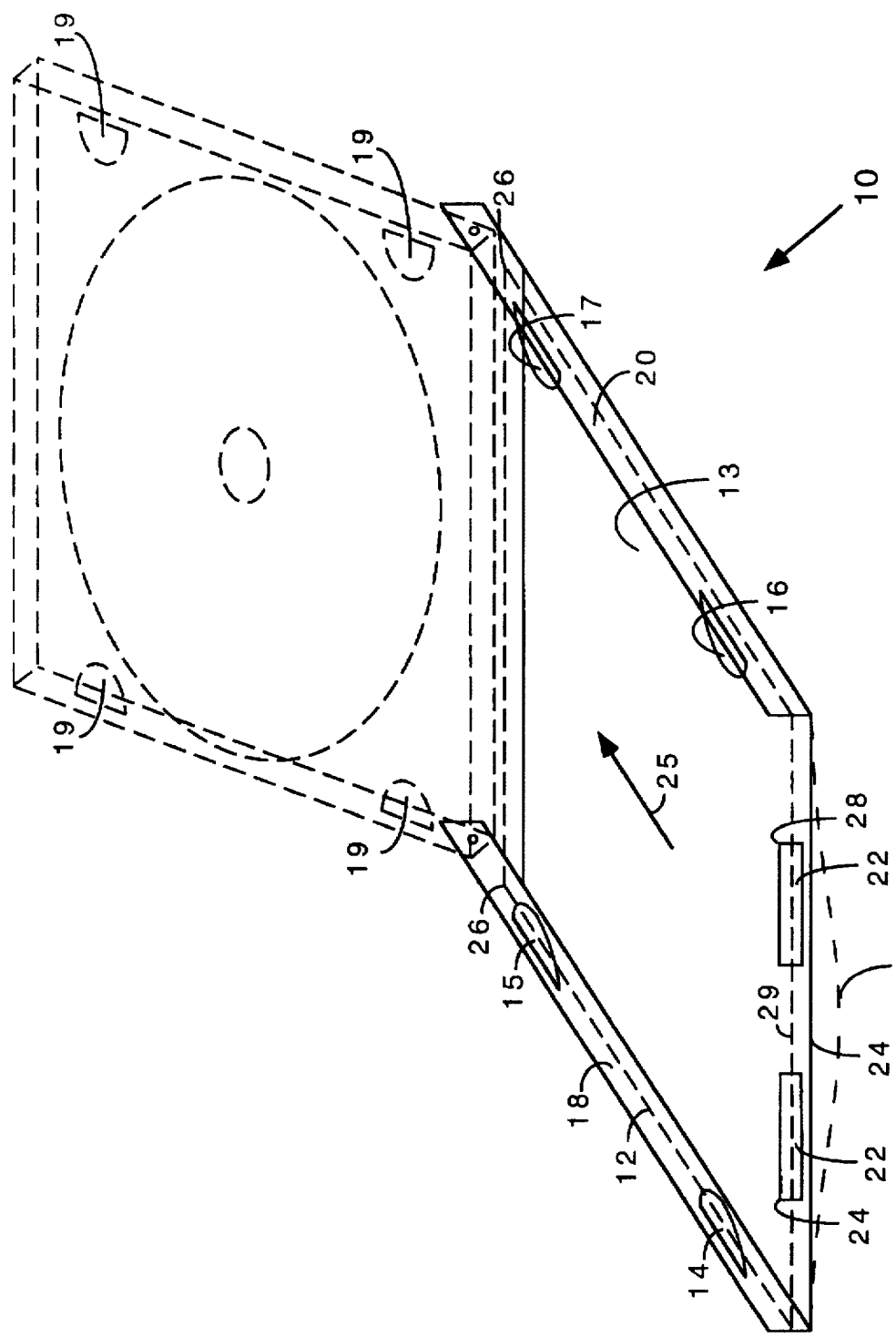
FIG. 1 is a perspective view of the booklet storage portion of a conventional CD case, with the CD storage portion shown in phantom lines.

As noted, the CD storage portion of the case is shown in phantom lines. This portion may be substantially conventional. However, it may be desirable to modify tab recesses 19 (of FIG. 1), which are provided to receive conventional booklet storage tabs 14 and 16 (of FIG. 1) while the CD case is closed, to match the shape of the slot flanges of FIG. 2.

Moreover, depending upon the height of slot flanges 116 and 118 above base 106, it may be desirable to further modify the CD storage portion to allow sufficient space for the CD to lie between top surfaces of slot flanges 116 and 118 and the base of the CD storage portion when the CD case is closed. For example, the CD storage portion may be configured to position the CD at a greater distance from base 106 while the case is closed by making the CD storage portion deeper. Alternatively, slot flanges 116 and 118 of the booklet storage portion may positioned closer to base 106, than in conventional CD cases, by an amount sufficient to permit use of a conventional CD storage portion. Such may result in lesser space for a booklet, i.e. the slot spacing between the bottom surfaces of the slot flanges and base 106 may be diminished. However, because insertion problems are substantially eliminated, the lesser booklet space is not a significant disadvantage. Indeed, in many conventional CD cases, thick booklets cannot easily be used, even though the slot spacing is sufficient, because the booklet catches during insertion. With the CD case of the invention, however, relatively thick booklets can be inserted, even though the slot spacing may be relatively narrow, because smooth reliable insertion is achieved.

FIG. 2 also illustrates a blocking member 124 which helps prevent the booklet from sliding out from beneath slot flanges 116 and 118. Blocking member 124 is tapered with decreasing height from a center 126 of leading edge 128 of base 106 to side edges 112 and 114. As will be described more fully below, the tapered profile of blocking member 124 helps prevent the booklet from accidently sliding out from the case while also permitting the booklet to be easily removed when desired.

Figure 3:
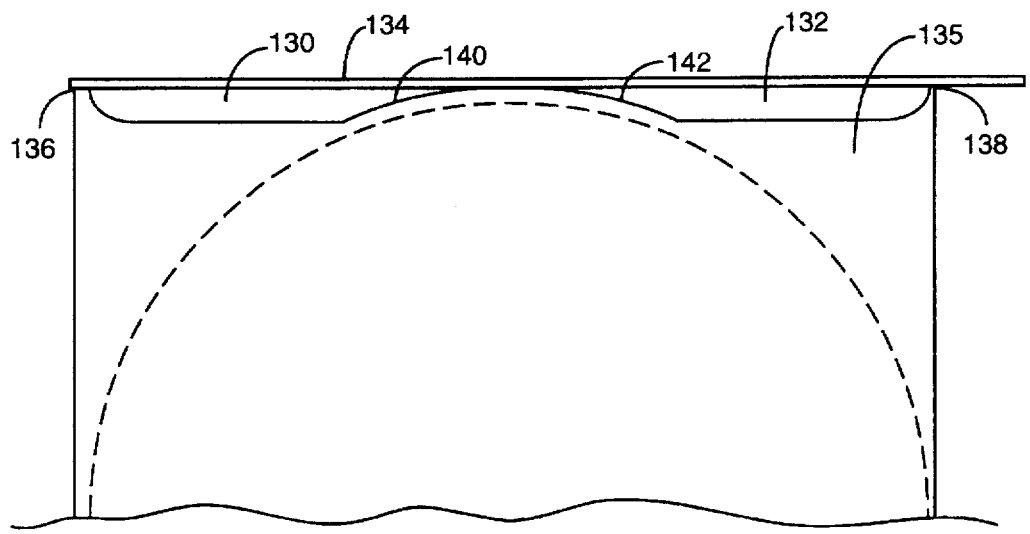
FIG. 3 is a planar view of a portion of a CD case, configured in accordance with an alternative embodiment of the invention, particularly illustrating a booklet slot flange formed of a pair of spaced-apart portions.

FIG. 3 illustrates an embodiment of the CD case wherein each slot flange is formed of two spaced-apart portions 130 and 132. Together, the two portions cover at least half of the distance along side edge 134 between front corner 136 and rear corner 138. Because the flange portions 130 and 132 cover a substantial portion of the side edge, a booklet inserted beneath the flange is less likely to catch than with the conventional CD cases, of type described above, wherein two widely-spaced-apart tabs are provided. In particular, the relatively long front flange 130 helps channel the booklet along a line extending beneath rear flange portion 132. Hence, the booklet is not likely to miss the entrance of the rear flange portion.

In many conventional CD cases, tabs (such as 14 and 16 of FIG. 1) cover only a small fraction of the overall side edge length of the CD case. Indeed, in some, side tabs cover only 2.0 cm of a total 12.5 cm side edge length. In other words, only about 20% of the side edge length of the CD case is covered by booklet-holding tabs. In accordance with the invention, improvement can be achieved by providing slot flanges that cover a larger percentage of the side edge length. In some embodiments, at least half, and preferably most, of the side edge length is covered. However, benefits of the invention can be achieved even when a lesser portion, such as 25% to 50%, of the side edge length is collectively covered by slot flange portions. In one embodiment, the slot flange portions cover about one third of the side edge length. In another, the slot flange portions cover about two thirds of the side edge length, i.e. for a 12.5 cm side edge length, the slot flange portions collectively cover about 8 cm. For embodiments wherein the slot flange width (i.e. the distance to which the flange extends outwardly from the side wall) varies along its length, the "covered portion" of the side edge length may be defined as the total length covered by portions of the flange having widths equaling or exceeding the full-width half maximum width of the flange.

As with the embodiment of FIG. 2, no openings through the side walls are employed, hence disadvantages of such openings, described above, are also avoided. It should be noted, however, that benefits of the invention can be gained even if such openings are employed, although it is preferred that the formation of such openings be avoided.

By providing spaced-apart portions, the height (relative to base 135) of the portions can be higher than that of single slot flanges 116 and 118 (of FIG. 2) while still allowing sufficient space for the CD itself while the CD case is closed. In general, a trade-off exists between the allowable height of the slot flange portions and the narrowness of the gap between the flange portions. In the embodiment of FIG. 3, the slot flange portions are made as wide as possible while still allowing the CD (shown in phantom lines) to lie between the flange portions when the CD case is closed. Such allows the slot flange portions to be relatively high, thereby allowing storage of a relatively thick booklet. Also, as shown, inner corners 140 and 142 of the flange portions have circular indentations configured to allow the CD to rest between them. The circular indentations define a circle of radius substantially equal to that of a CD, e.g. about 6 cm. In this manner, substantially maximum slot coverage of the length of side edge 134 is provided (thereby facilitating booklet insertion), while substantially maximum flange height is also achieved (thereby allowing for relatively thick booklets to be stored).

Figure 4:
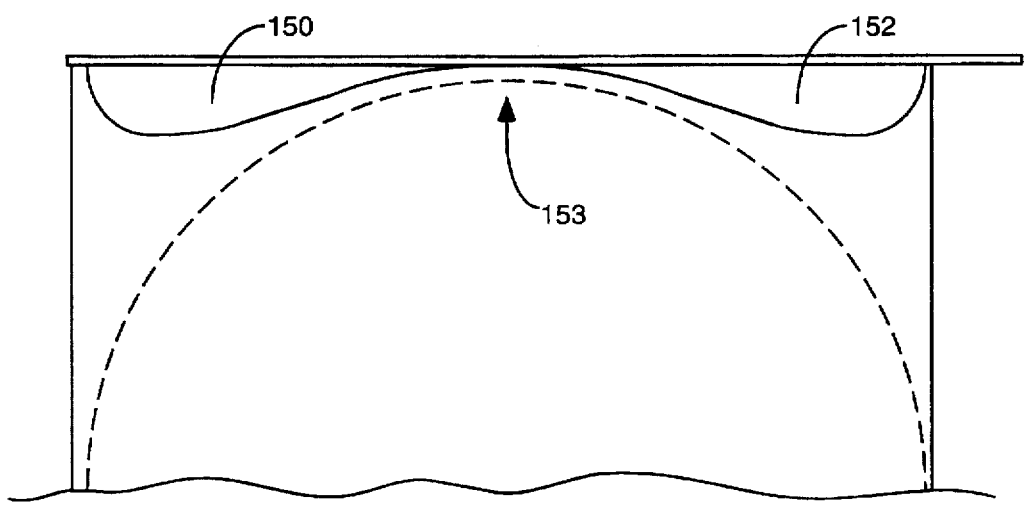
FIG. 4 is a planar view of a portion of a CD case, configured in accordance with another alternative embodiment of the invention, particularly showing a booklet slot flange formed of a single member having a single, substantially conic, indentation.

FIG. 4 illustrates an alternative embodiment wherein slot flange portions 150 and 152 have a more graceful profile having a center recessed portion 153 of a substantially conic shape.

As with the embodiment of FIG. 3, the slot flange portions are offset from the CD (shown in phantom lines) while the CD case is closed. Hence, no added limitation on the height of the flanges, and therefore on the booklet thickness, occurs.

Figure 5:
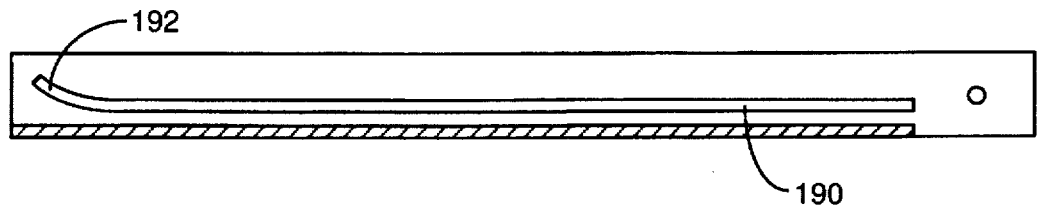
FIG. 5 is a side elevational view of a portion of a CD case, configured in accordance with another alternative embodiment of the invention, particularly showing a booklet slot flange formed of a single member having an upwardly sloped forward end.

In the embodiments of FIGS. 2–4, slot flanges are of equal height along their length. In other embodiments, however, slot flanges (or slot flange portions) vary in height along their length. FIG. 5 illustrates such a configuration for a single continuous slot flange. A flange 190, shown in a side elevational view, has a front portion 192 which is sloped upwardly to help facilitate insertion of a booklet. In some embodiments, the height of the flanges vary in accordance with a circular, conic, exponential or logarithmic profile.

Note that the upwardly sloped portion of the slot flange of FIG. 5 is near a corner edge of the case and hence does not interfere with closure of the CD case when a CD is held inside. Moreover, the un-sloped portions of the flange, which are nearer to the center of the case are at a lower height and hence also do not interfere with closure of the CD case. Use of the upwardly sloped flange may require, or at least allow, a front blocking member even higher than those described with respect to FIG. 2 and FIGS. 6–8 (described below). Also, an upwardly sloped flange may require further modification to the tab recesses of the CD storage portion (such as recesses 19 of FIG. 1.)

Figure 6:
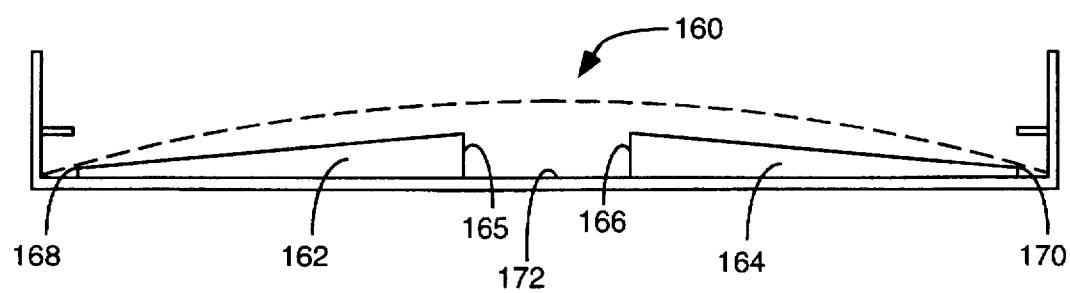
FIG. 6 is a front elevational view of a portion of a CD case, configured in accordance with yet another alternative embodiment of the invention, particularly illustrating a blocking member formed of a pair of tapered, spaced-apart, portions.
Figure 7A:
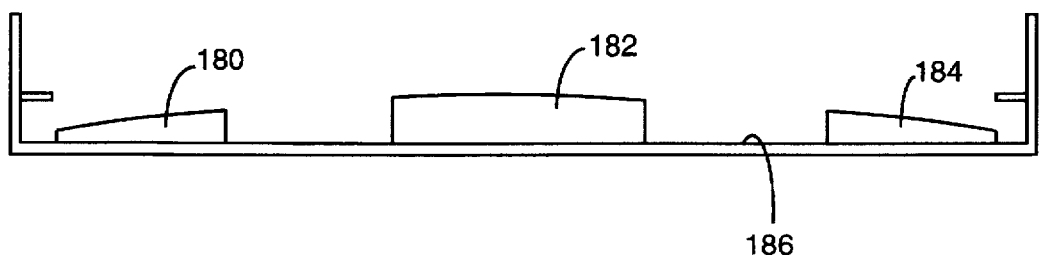
FIG. 7A is a front elevational view of a portion of a CD case, configured in accordance with yet another alternative embodiment of the invention, showing a blocking member formed of three portions collectively having a tapered profile.
Figure 7B:
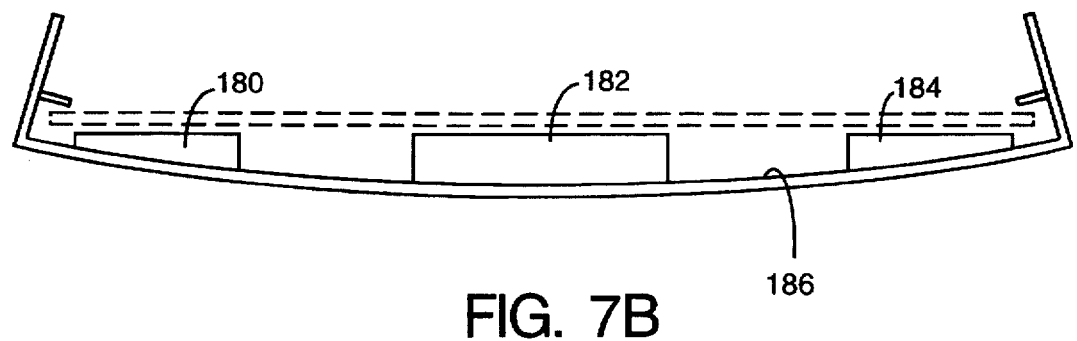
FIG. 7B is a front elevational view of the CD case of FIG. 7B shown with the center of the front edge of the case bent downwardly to allow removal of a booklet, shown in phantom lines.
Figure 8:
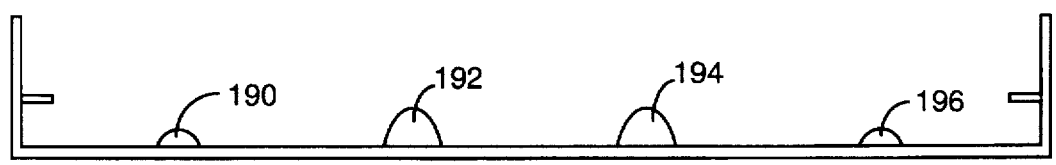
FIG. 8 is a front elevational view of a portion of yet another CD case, configured in accordance with the invention, showing a blocking member formed of a plurality of knob-like protrusion which collectively form a tapered profile.

FIGS. 6–8 illustrate alternative embodiments of the blocking member described above with reference to FIG. 2.

FIG. 6 shows a blocking member 160 formed of two portions 162 and 164 which together provide for an overall linear tapered profile. Inner edges 165 and 166 of the two portions are considerably higher than outer corners 168 and 170. In one embodiment, the inner flanges are configured to be considerably higher than the height of the conventional rectangular blocking members shown in FIG. 1 (which are typically about 1 mm in height). As such, improved blocking is achieved and a booklet held behind the blocking member is less likely to be accidently dislodged. However, when the center of the front edge of the booklet is bent upwardly for removal (as shown in phantom lines), center portions of the booklet are displaced sufficiently from the base 172 to easily pass over even the highest points of the blocking member. It should be appreciated that a rectangular blocking member would require a lower overall height to allow outer portions of the booklet to pass unhindered over the outer edges of the blocking members. The configuration of FIG. 5, however, exploits that fact that the booklet is bent prior to removal. Moreover, although the advantages of the tapered configuration have been described with reference to a booklet which is bent upwardly, the tapered configuration has the same advantages when the booklet is removed by bending the center of the front edge of CD case base 172 downwardly. This is further illustrated in FIGS. 7A and 7B.

FIG. 7A shows a blocking member formed of three portions 180, 182 and 184 which together form a profile, relative to a flat base 186, substantially conforming to an inverted catenary equation, such as:

$$y = b - a/2(e^{x/a} + e^{-x/a})$$

where y represents the height of the blocking members, x represents the relative distance along the front edge of the case relative to the center of the front edge of the case, and wherein b and a are parameters selected in accordance with principles of the invention. In one embodiment, a and b may be selected to place the height of the highest-most portion of the blocking member at about 2 mm and to place the side edges of the blocking member (i.e. the point wherein the height of the blocking member drops to zero) at about 6 cms from the centerpoint of the front edge.

Other suitable profiles conform to portions of any of the following functions: linear, conic, hyperbolic, cycloid, trochoid, ovals of cassini, logarithmic, or exponential.

FIG. 7B shows base 186 bent to allow removal of a booklet (shown in phantom lines). As can be seen, the bending of the base into a curved profile aligns top edges of the flange portions into a line. Such allows the booklet, which is held straight, to be easily removed. As with the tapered flanges of FIG. 5, the flanges of FIGS. 7A and 7B are high at the center to prevent accidental removal of the booklet, but low at the edges to allow the booklet to be easily intentionally removed when either the case or the booklet is bent. Of course, the booklet can also be removed by other conventional motions.

In one embodiment, the tapered profile of the blocking member is configured to substantially match the shape that the front edge of the case assumes when bent downwardly. Hence, when the edge of the case is bent downwardly (and the blocking member is likewise bent downwardly), the blocking member assumes a flat profile (as illustrated in FIG. 7B). In other words, the blocking member profile is configured as the inverse of the shape of the bent case. Such may represent the optimal tapered profile as it would appear to provide for unhindered removal of the booklet when the case is bent, while also providing for maximum blockage of the case when not bent. The specific tapered profile necessary to achieve such a result depends, of course, on the specific size, shape, and bending characteristics (such as stress and strain tensors) of the CD case and can be determined from suitable experiments with particular CD cases. The inverse catenary curve defined above provides a suitable approximation of such a profile, but more refined equations may provide an even better tapered profile.

As an alternative, the tapered profile may be configured to match the shape that an average booklet assumes when bent upwardly. Again, optimal profiles may be determined based upon the characteristics of average booklets and can be determined from suitable experiments. An exemplary tapered profile, which provides a suitable approximation, is set forth in Table I.

TABLE I

| Distance Along Front Edge in Centimeters | Height of Blocking Member in Millimeters |
|---|---|
| 0.0 | 0.00 |
| 1.0 | 0.67 |
| 2.0 | 1.20 |
| 3.0 | 1.47 |
| 4.0 | 1.90 |
| 5.0 | 1.93 |
| 6.0 | 2.00 |
| 7.0 | 1.93 |
| 8.0 | 1.90 |
| 9.0 | 1.47 |
| 10.0 | 1.20 |
| 11.0 | 0.67 |
| 12.0 | 0.00 |

FIG. 8 illustrates another embodiment wherein the blocking member includes four knob-like protrusions 190, 192, 194 and 196, which collectively form a tapered profile. More protrusions may alternatively be employed. In other embodiments, only three may be used, with a central knob-like protrusion being significantly higher than a pair of laterally offset protrusions. In embodiments wherein the blocking member includes a plurality of portions, such as that of FIG. 8, the overall tapered profile may be represented by the highest-most point of each individual portion and not necessarily by the entire length of each blocking portion. Also, the blocking member, or its portions, may have a tapered profile along the direction of removal of the booklet. In other words, the blocking member need not have vertical front and rear walls. For example, in the embodiment of FIG. 8, each knob may have an overall conic shape.

What have been described are exemplary embodiments of a CD case having an improved structure for receiving and holding a booklet, such as one containing CD liner notes or CD-ROM instructions. However, the invention can be applied to similar structures storing any type of printed material, whether in book form or otherwise, and indeed can be applied to structures storing other material (flexible or otherwise) within slots. The CD case of the invention can be manufactured with conventional techniques such as blow molding. The specific dimensions and configurations of the structures described herein can vary in accordance with the needs of specific applications. Optimal dimensions for these structures can also vary. Drawings are not to scale. Where distances are specified relative to the side edge length of the CD case, the "side edge length" refers to the portion of the side edge that receives the booklet, excluding any portions that extend substantially beyond the booklet (such as the portion of the side wall that extends rearwardly to provide a pivot point for the CD storage portion of the case.)

In general, the exemplary embodiments of the invention are merely illustrative of general principles of the invention which can be applied to other applications, to achieve other ends and to remedy other problems not specified herein.

I claim:

1. A compact disk storage case, said compact disk storage case comprising:

a substantially flat base, having opposing side edges and opposing front and rear edges;

a pair of side walls extending upwardly from, and substantially perpendicularly to, said opposing side edges;

a pair of inwardly extending slot flange members, extending substantially perpendicularly from said side walls, parallel with said flat base, toward one another, said slot flange members extending along at least one half of a side edge length between said front and rear edges, said slot flange members, in combination with said side members and said base, forming a pair of opposing slots for receiving and holding side edges of at least one sheet of substantially flat material; and an upwardly extending blocking member formed along at least a portion of said front edge, said upwardly extending blocking member having a tapered profile of decreasing height with increasing distance from a center of said front edge toward said side edges.

2. The compact disk storage case of claim 1, wherein said upwardly extending blocking member includes a plurality of separate portions separated from one another by gaps, said portions collectively forming said tapered profile.

3. The compact disk storage case of claim 1 wherein said separate portions are each knob-like protrusions.

4. The compact disk storage case of claim 1, further including a secondary base configured to hold a compact disk, said secondary base hinged to said rear edge of said flat base.

5. The compact disk storage case of claim 1, wherein each of said slot flange members includes a plurality of separate portions separated from one another by gaps, said portions collectively covering at least one half of said side edge length.

6. The compact disk storage case of claim 8 wherein at least two of said portions form each slot flange and wherein inner corners of said portions include substantially circular indentations each having a radius of curvature of about six centimeters.

7. The compact disk storage case of claim 1 wherein said slot flange members have upwardly sloped front ends relative to said flat base.

8. The compact disk storage case of claim 1 wherein said tapered profile has a shape selected from a group of shapes consisting of inverted catenary, conic, hyperbolic, cycloid, trochiod, ovals of cassini, logarithmic, and exponential.

9. The compact disk storage case of claim 1 wherein said tapered profile has a shape substantially conforming to an inverted catenary equation described by the equation:

$$y=b-a/2(e^{x/a}+e^{-x/a})$$

where y represents the height of the blocking members, x represents the relative distance along the front edge of the case relative to the center of the front edge, and wherein b and a are pre-selected parameters.

10. The compact disk storage case of claim 7 wherein said upwardly sloped front ends of said slot flange members each have a shape selected from a group of shapes consisting of circular, conic, logarithmic, and exponential.

11. The compact disk storage case of claim 1 wherein said slot flange members each include a single member having a center recessed portion of a substantially conic shape.

12. The compact disk storage case of claim 1 wherein said tapered profile has a shape substantially conforming to the distance along said front edge in centimeters and the height of said blocking member in millimeters as in TABLE 1.

13. A compact disk storage case, said compact disk storage case comprising:

a substantially flat base, having opposing side edges and opposing front and rear edges;

slot means, formed along side edges of the base, for receiving and holding at least one sheet of substantially flat material against the base;

an upwardly extending blocking member formed along at least a portion of said front edge, said upwardly extending blocking member having a tapered profile of decreasing height with increasing distance from a center of said front edge toward said side edges; and a secondary base configured to hold a compact disk, said secondary base hinged to an edge of said flat base.

14. The compact disk storage case of claim 13, wherein said upwardly extending blocking member includes a plurality of separate portions separated from one another by gaps, said portions collectively forming said tapered profile.

15. The compact disk storage case of claim 13, wherein said slot means comprises a pair of side walls extending upwardly and substantially perpendicularly from said opposing side edges; and a pair of inwardly extending slot flange members, extending substantially perpendicularly from said side walls, parallel with said flat base, toward one another, said slot flange members extending along at least half of a side edge length between said front and rear edges, said slot flange members, in combination with said side walls and said base, forming a pair of opposing slots for receiving and holding sides edges of the material.

16. The compact disk storage case of claim 15, wherein each of said slot flange members includes a plurality of separate portions separated from one another by gaps, said portions collectively covering at least half of said side edge length.

17. The compact disk storage case of claim 16 wherein at least two of said portions form each slot flange member and wherein inner corners of said portions include substantially circular indentations each having a radius of curvature of about six centimeters.

18. The compact disk storage case of claim 15 wherein said slot flange members have upwardly sloped front ends relative to said flat base.

19. The compact disk storage case of claim 13 wherein said tapered profile has a shape selected from a group of shapes consisting of inverted catenary, conic, hyperbolic, cycloid, trochoid, ovals of cassini, logarithmic, and exponential.

20. The compact disk storage case of claim 13 wherein said tapered profile has a shape substantially conforming to an inverted catenary equation described by the equation:

$$y=b-a/2(e^{x/a}+e^{-x/a})$$

where y represents the height of the blocking members, x represents the relative distance along the front edge of the case relative to the center of the front edge, and wherein b and a are pre-selected parameters.

21. The compact disk storage case of claim 18 wherein said upwardly sloped front ends of said slot flange members each have a shape selected from a group of shapes consisting of circular, conic, logarithmic, and exponential.

22. The compact disk storage case of claim 15 wherein said slot flange members each include a single member having a center recessed portion of a substantially conic shape.

23. The compact disk storage case of claim 13 wherein said tapered profile has a shape substantially conforming to the distance along said front edge in centimeters and the height of said blocking member in millimeters as in TABLE 1.

24. A compact disk storage case, said compact disk storage case comprising:

a substantially flat base, having opposing side edges and opposing front and rear edges;

slot means, formed along side edges of the base, for receiving and holding at least one sheet of substantially flat material against the base;

an upwardly extending blocking member formed along at least a portion of said front edge, said upwardly extending blocking member having a tapered profile of decreasing height with increasing distance from a center of said front edge toward said side edges; and wherein said tapered profile has a shape selected from a group of shapes consisting of inverted catenary, conic, hyperbolic, cycloid, trochoid, ovals of cassini, logarithmic, and exponential.

* * * * *